United States Patent [19]

Pennila

[11] 4,074,671

[45] Feb. 21, 1978

[54] THIN AND LOW SPECIFIC HEAT CERAMIC COATING AND METHOD FOR INCREASING OPERATING EFFICIENCY OF INTERNAL COMBUSTION ENGINES

[76] Inventor: Simo A. O. Pennila, 66B River Bend Road, Stratford, Conn. 06497

[21] Appl. No.: 708,838

[22] Filed: July 26, 1976

Related U.S. Application Data

[63] Continuation of Ser. No. 519,664, Oct. 31, 1974, abandoned.

[51] Int. Cl.[2] .................... F02B 23/00; F16J 1/04

[52] U.S. Cl. .................... 123/191 A; 123/191 R; 92/223

[58] Field of Search ............ 92/169, 223; 123/191 A, 123/191 R, 193 R; 428/472, 469, 539

[56] References Cited

U.S. PATENT DOCUMENTS

| | | | |
|---|---|---|---|
| 2,978,360 | 4/1961 | Bradstreet | 123/191 A |
| 3,019,277 | 1/1962 | Rudy | 123/191 A |
| 3,066,663 | 12/1962 | Rudy | 123/191 A |
| 3,375,127 | 3/1968 | Mellor | 428/472 |
| 3,408,995 | 11/1968 | Johnson | 123/191 A |
| 3,459,167 | 8/1969 | Briggs | 92/223 |
| 3,514,319 | 5/1970 | Hata | 428/472 |
| 3,620,137 | 11/1971 | Prasse | 92/169 |
| 3,855,986 | 12/1974 | Wiss | 123/191 A |

*Primary Examiner*—Charles J. Myhre
*Assistant Examiner*—William Randolph
*Attorney, Agent, or Firm*—Parmelee, Johnson & Bollinger

[57] ABSTRACT

An internal combustion engine having combustion chamber walls coated with a thin ceramic coating with a specific heat of less than 0.12 BTU/lb/° F, a thermal conductivity of less than 11 BTU/HR/FT/° F and a thickness of 0.2 to 1 mil so as to reduce heat losses and increase efficiency of the engine.

2 Claims, 8 Drawing Figures

LEGEND tg = GAS TEMPERATURE ts = SURFACE TEMPERATURE

THIN AND LOW SPECIFIC HEAT CERAMIC COATING AND METHOD FOR INCREASING OPERATING EFFICIENCY OF INTERNAL COMBUSTION ENGINES

This is a continuation of application Ser. No. 519,664 filed Oct. 31, 1974 now abandoned.

This invention relates to internal combustion and similar type engines and particularly to combustion chamber coatings exposed to gases therein.

The cooling losses in present internal combustion engines represents 35 to 39% of the total losses. In the prior art, various metallic coatings have been suggested to reflect heat or infrared radiations back to gases so as to increase engine performance. Briggs U.S. Pat. No. 3,459,167 uses a copper coating with an insulating underlayer to reduce infrared radiation losses. Catalytic metals and ceramic materials with catalytic components have been suggested to cause more complete burning during the work stroke, such as seen in Philipp U.S. Pat. No. 2,914,048. None of these has been completely satisfactory.

One of the objects of the invention is to improve the operating efficiency of an internal combustion engine, such as two or four cycle engines as well as rotary piston engines which are commonly referred to as "Wankel" engines.

In the present invention, the heat flow through the surfaces exposed to gases in the combustion chamber is decreased by use of thin ceramic coatings which have certain specific heat and thermal conductivity values as will be set forth in detail in the following description. As will be described hereafter, the flow of heat is controlled by choice of materials so that the surface area rapidly reaches the temperature of the gases so as to reduce heat flow or transfer due to the smaller temperature difference. Also, the thermal conductivity is chosen such that the heat flow from the surface inwardly is reduced.

Suitable ceramic coating materials are the nitrides, carbides and oxides of tantalum or niobium (Group V*b*) and zirconium or hafnium (Group IV*b*). These could be applied, for example, by plasma spray, thermo-spray, powder gas flame spray, hard facing, or other similar known processes for applying thin ceramic material coatings.

These and other objects, features and advantages of the invention will become apparent from the following description and drawings which are merely exemplary.

The thermal flow through the surface is the result of several factors or can be set forth in the following formula:

$$\phi = \Delta \times A \times \Delta T$$

wherein $\phi$ is the thermal flow.

$\alpha$ = Thermal coefficient between gases and surfaces. Reflecting surfaces and similar approaches have been used to reduce the value of this factor.

A = Area of surfaces which are exposed to gases. This factor is usually improved by proper combustion chamber design.

ΔT = Temperature difference between the gases and the surfaces. Conventionally this factor has been improved by letting surface temperature rise as high as practically possible considering materials, lubrication and still low enough to prevent "hot spots."

Figure 1:
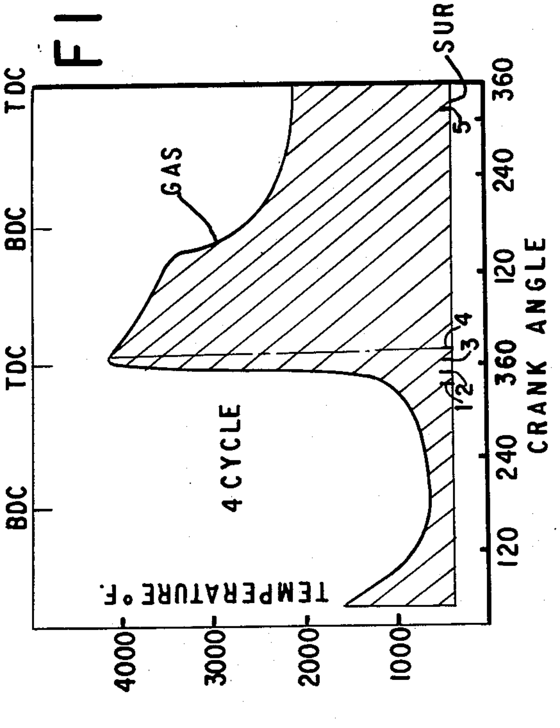
FIG. 1 is a graph taken from Fundamentals of Internal Combustion Engines, Gill et al, United States Naval Institute, 1959, pp. 9-6, having a vertically lined section which shows how temperature difference ΔT varies during the work cycle.
Figure 2:
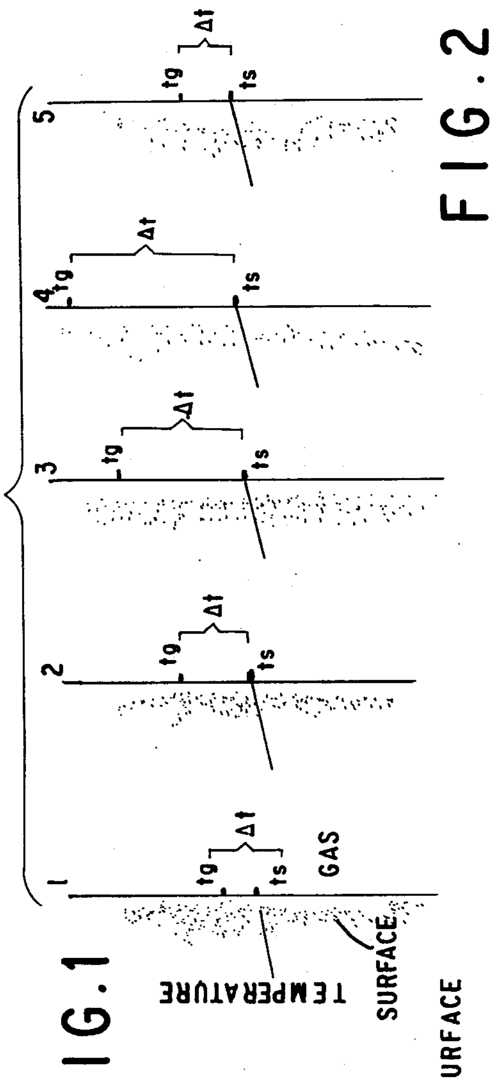
FIG. 2 is a graph illustrative of some of the temperature conditions that might be expected to exist in the combustion chamber at the points indicated 1, 2, 3, 4 and 5 of FIG. 1.
Figure 3:
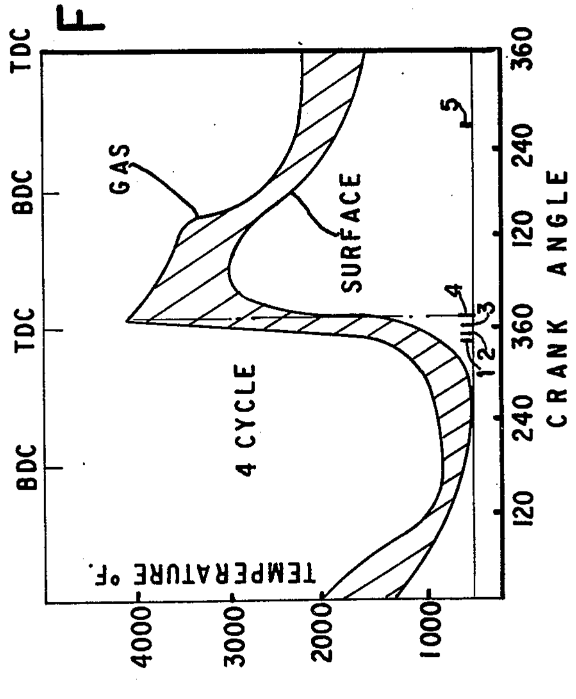
FIG. 3 is similar to FIG. 1 except it depicts exaggerated illustrative conditions with a ceramic coating material of the present invention, the vertically lined portion being between the coated surface and the gas temperature.
Figure 4:
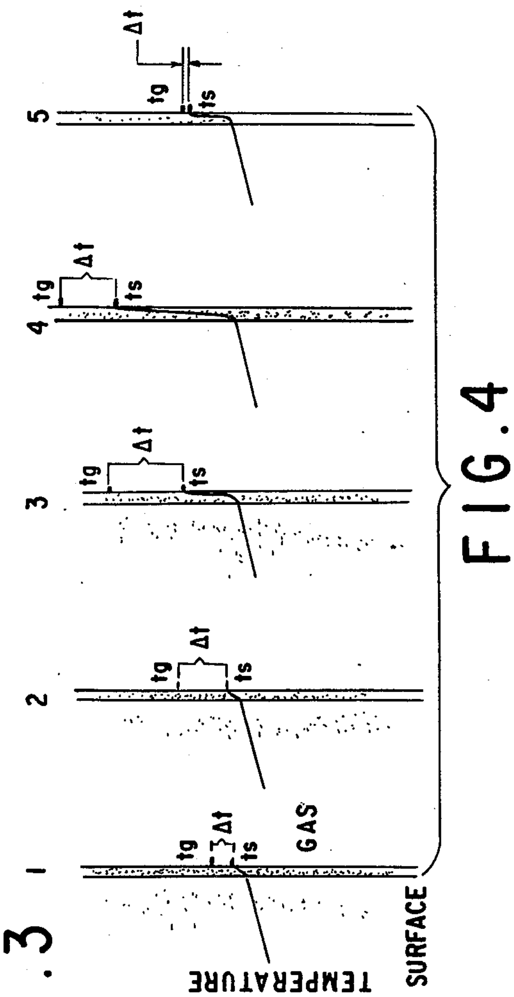
FIG. 4 is similar to FIG. 2 except it shows conditions which may be expected to be existant when a ceramic coating is employed in accordance with the present invention.

In this invention, the exposed surfaces are covered or coated by material which is able to increase its temperature very rapidly when the first heat impacts the surface so that the temperature difference ΔT is drastically reduced during the rest of the work stroke. This is made possible by choosing the material as will appear hereafter so that the specific heat is less than 0.12 BTU/lb/° F between 1200° and 2000° F. The thermal conductivity of the coating material should be less than 11 BTU/HR/FT/° F between 1200° and 2000° F. It can be seen that as schematically shown in FIG. 3, the lined area is smaller than in FIG. 1 which indicates a smaller heat loss. As can be seen in FIG. 4, when the heat shock or impact at or during combustion time is over, the surface cools again.

Figure 5:
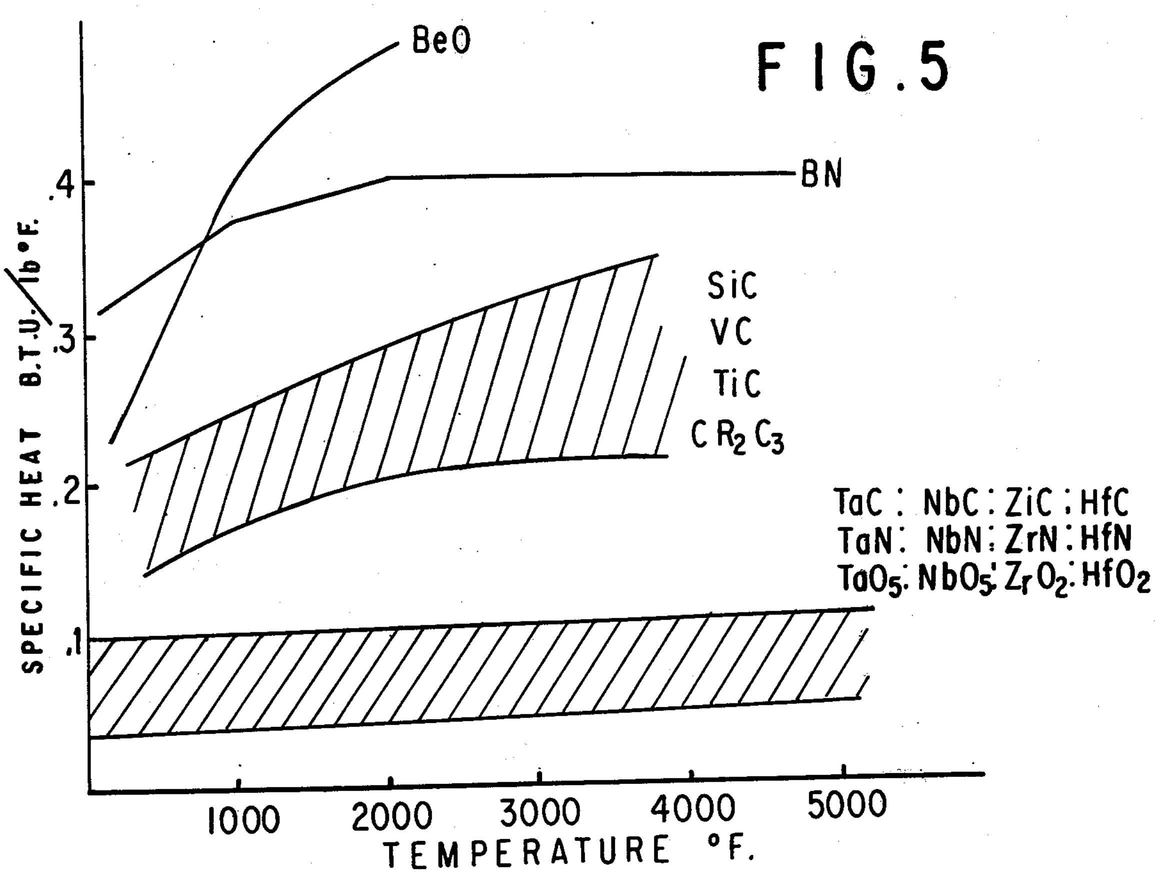
FIGS. 5 and 6 show the relation between temperature and specific heat and thermal conductivity for coatings suitable for the present invention as compared to some that are not.
Figure 6:
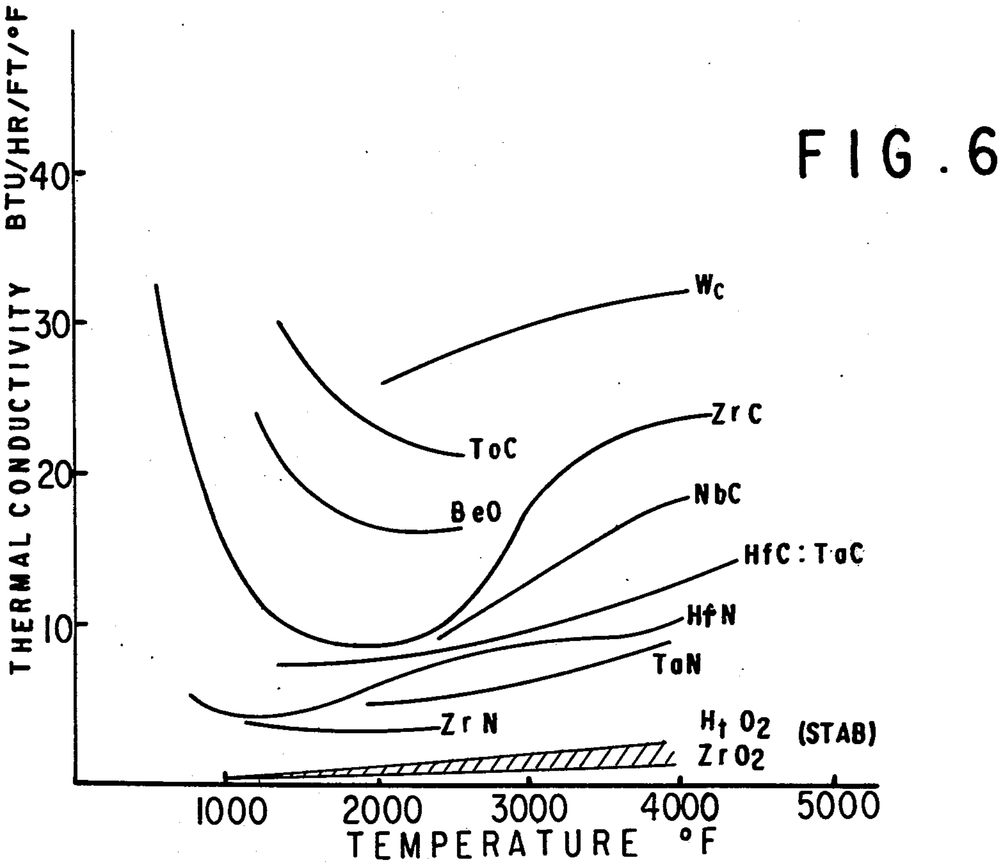

Certain of the carbides, nitrides and oxides can be useful for the coating as discussed for the present invention, such as can be seen in FIGS. 5 and 6. These are:

| | | |
|---|---|---|
| TaC | TaN | $Ta_2O_5$ |
| NbC | NbN | $Nb_2O_5$ |
| ZrC | ZrN | $ZrO_2$ |
| HfC | HfN | $HfO_2$ |

The thickness of the coating can be between 0.2 and 1 mil, the coating being applied in any conventional manner as previously discussed.

Figure 7:
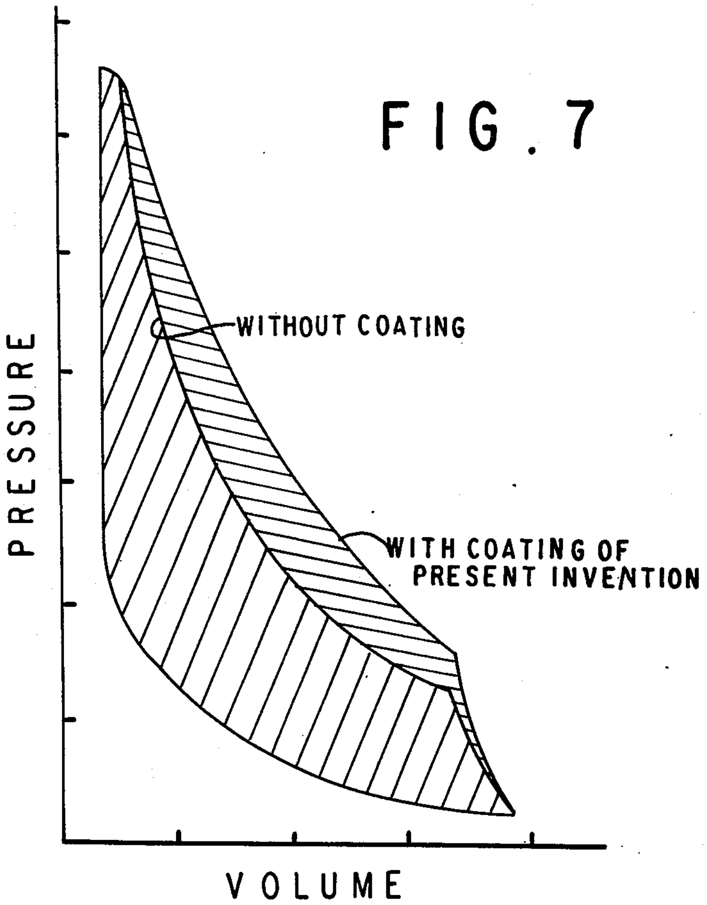
FIG. 7 shows the effect that the surface coating hereof has on the conventional PV diagram.

FIG. 7 illustrates the effect of using a coating material wherein it can be seen that the area of the diagram is wider as compared to the conventional PV diagram. The maximum pressure is the same as without a surface coating so that the stresses on the engine parts are not changed.

Figure 8:
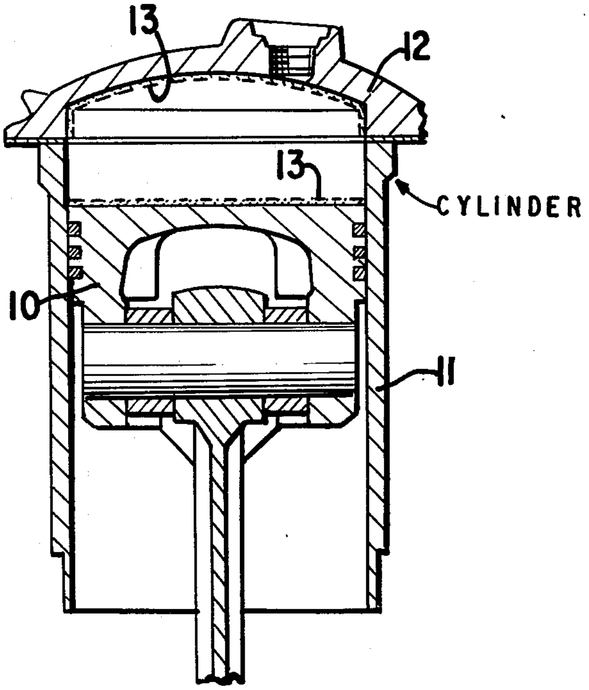
FIG. 8 is a partial section of a combustion chamber in accordance with the present invention.

FIG. 8 depicts an engine having a piston 10 reciprocable in cylinder 11. The usual cylinder head 12 can be mounted on cylinder 11. Coating 13 of the kind described is shown.

It should be apparent that variations can be made in the method and construction without departing from the spirit of the invention except as defined in the appended claims.

What is claimed is:

1. An internal combustion engine with a cycle including a compression stroke, a work stroke and an exhaust stroke, said engine having a coated internal wall surface of the combustion chamber thereof, said internal wall surface having a thin coating thereon of ceramic material, the exposed surface of said coating being able to increase and decrease its temperature very rapidly in response to temperature changes in the combustion chamber during said strokes, said coating having a thickness from 0.2 to 1 mil, said ceramic material forming said coating having a specific heat of less than 0.12 BTU/lb/° F at a temperature between 1200° and 2000° F., and said ceramic material also having a thermal conductivity of less than 11 BTU/HR/FT/° F at a temperature between 1200 and 2000° F. so that the temperature of the exposed surface of said thin coating during the work stroke is rapidly raised to a temperature close to the temperature of the hot gas in the combustion chamber, whereby due to the momentarily smaller temperature differences between the hot gas and the exposed surface of said coating there is a reduced heat transfer from the hot gas inwardly into said internal wall surface for the remainder of the work stroke, and so that the temperature of the exposed surface of said thin coating after the work stroke rapidly cools during the exhaust and compression strokes thereby being again cool for the beginning of the next work stroke, thus reducing heat loss into the internal wall surface of the combustion chamber and increasing engine efficiency.

2. An internal combustion engine as claimed in claim 1 wherein the coating material is selected from the group consisting of:

| | | |
|---|---|---|
| TaC | TaN | $Ta_2O_5$ |
| NbC | NbN | $Nb_2O_5$ |
| ZrC | ZrN | $ZrO_2$ |
| HfC | HfN | $HfO_2$ |

* * * * *